(No Model.)

T. D. REAVES.
ANIMAL POKE.

No. 345,859. Patented July 20, 1886.

WITNESSES:

INVENTOR:
T. D. Reaves
BY Munn & Co
ATTORNEYS.

UNITED STATES PATENT OFFICE.

TIMOTHY D. REAVES, OF FARMINGTON, KENTUCKY.

ANIMAL-POKE.

SPECIFICATION forming part of Letters Patent No. 345,859, dated July 20, 1886.

Application filed October 15, 1885. Serial No. 179,973. (No model.)

*To all whom it may concern:*

Be it known that I, TIMOTHY D. REAVES, of Farmington, in the county of Graves and State of Kentucky, have invented a new and Improved Animal-Poke, of which the following is a full, clear, and exact description.

My invention relates to pokes to be attached to the heads of cattle, horses, or other live stock to prevent them from jumping over or demolishing fences, and has for its object to provide a simple inexpensive device for this purpose, and one which shall be more effective in its action and less oppressive or disagreeable to the animals, and will allow them to graze more naturally and comfortably than will appliances of this character heretofore employed.

The invention consists in certain novel features of construction and combinations of parts of the animal-poke, all as hereinafter fully described and claimed.

Reference is to be had to the accompanying drawings, forming part of this specification, in which similar letters of reference indicate corresponding parts in both the figures.

Figure 1:
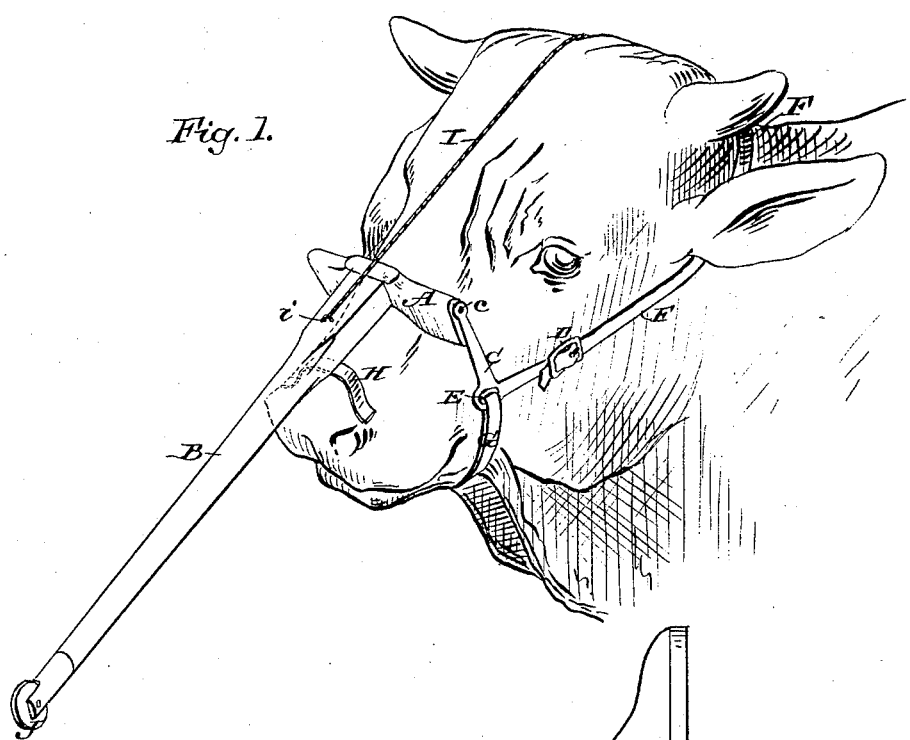
Figure 2:
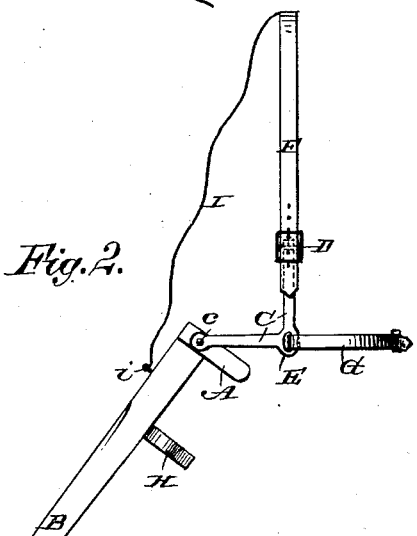

Figure 1 is a perspective view of my improved poke as applied to the head of an animal, and Fig. 2 is a side elevation of the animal-poke.

The letter A indicates the cross-bar or head-piece of the animal-poke, which is concaved at its lower edge to fit the arch of an animal's nose, or head just above the nose, and to which bar A the stale B is fixed in any approved way.

To each end of the cross-bar A is pivoted at *c* one end of an angular and metal jaw-brace, C, to the other end of which is attached a buckle, D, and at the angle of the brace C an opening or loop, E, is formed, so that the head-stall or crown-strap F may be fastened into the buckles D of the opposite jaw-braces, C, and be set over the head of the animal, so that the throat-latch strap G may be passed into the openings E of the opposite braces, C, and be buckled under the throat of the animal to hold the connected cross-bars A and stale B to the animal's head, as shown clearly in Fig. 1.

To the under side of the stale B, and near the cross-bar A, is fastened at its central part the metal plate H, which is bent downward at both ends into arch form and has out-turned extremities so that the plate H is adapted to rest on the outer part of the animal's nose just over the nostrils and without cutting the nose. The plate H preferably is elastic, so that while it rests on the animal's nose it has a tendency to compress the nostrils should the animal become unruly and fling his head about too much, and thus will tend to quiet the animal by causing him to lower his head, as when grazing, so as to rest the outer end of the stale B on the ground to relieve the pressure or clamping action of the plate H on his nostrils.

To the stale B, or to an eye or staple, *i*, fixed to said stale near the cross-bar A, is fixed one end of a cord, I, or it may be a strap or chain, the other end of which cord, I, is connected to the top of the crown-strap F in any approved way, and so that the cord may be adjusted at the strap for balancing the cross-bar A and stale B to control the maximum pressure of the plate H on the animal's nostrils, and also to hold the stale B at proper inclination when the animal lifts his head.

At the outer end of the stale B is journaled a roller or wheel, J, which rests and rolls on the ground when the animal is grazing, and thus prevents entrance of the stale into the ground and allows the animal to graze naturally and comfortably.

It is evident that should the animal wearing the poke attempt to jump a fence or to break down the fence by running head foremost into it, the stale B will strike the fence and hold the animal back.

The poke in suitable size may be secured to calves or other suckling animals to prevent them from sucking, and the poke may be applied to cows or other animals to prevent them milking themselves.

My improved animal-poke may be made very cheaply, will not hurt the animal, and may be put on the animal's head by any one.

Having thus described my invention, what I claim as new, and desire to secure by Letters Patent, is—

1. An animal-poke comprising a cross-bar, A, a stale, B, fixed thereto, jaw-braces C, pivoted to opposite ends of the cross-bar A, a crown-strap, F, connected to the opposite braces, C, a throat-latch, G, also connected to braces C, an arched plate, H, fixed to stale B and adapted to rest on the animal's nostrils when he lifts his head, a cord, I, connecting the stale B with the crown-strap, and a ground-roller, J, journaled at the outer end of the stale B, substantially as herein set forth.

2. In an animal poke, the combination, with the cross-bar A, stale B, the plate H, fixed to stale B, and adapted to rest on the animal's nostrils, and the crown-strap F, of the cord I, substantially as herein set forth.

3. An animal-poke provided with a bent plate, H, fixed to the stale B below the cross-bar or head-piece A, and positioned to rest on the animal's nostrils when his head is raised, substantially as herein set forth.

TIMOTHY D. REAVES.

Witnesses:
  LYNN HENDLEY,
  W. B. STOKES.